United States Patent
Li et al.

(10) Patent No.: US 8,231,954 B2
(45) Date of Patent: Jul. 31, 2012

(54) THERMOFORMED ARTICLES MADE FROM REACTIVE EXTRUSION PRODUCTS OF BIOBASED MATERIALS

(75) Inventors: Wei Li, Mason, OH (US); Richard A Tedford, Loveland, OH (US); Bruce J Thoman, Lebanon, OH (US)

(73) Assignee: International Paper Co., Memphis, TN (US)

(*) Notice: Subject to any disclaimer, the term of this patent is extended or adjusted under 35 U.S.C. 154(b) by 122 days.

(21) Appl. No.: 12/948,134

(22) Filed: Nov. 17, 2010

(65) Prior Publication Data

US 2011/0135863 A1 Jun. 9, 2011

Related U.S. Application Data

(60) Provisional application No. 61/267,651, filed on Dec. 8, 2009.

(51) Int. Cl.
*B29D 22/00* (2006.01)
(52) U.S. Cl. ............... 428/36.92; 428/35.1; 220/200; 215/200; 525/411; 525/450
(58) Field of Classification Search ............... 428/36.92, 428/35.1; 220/200; 215/200; 525/411, 450
See application file for complete search history.

(56) References Cited

U.S. PATENT DOCUMENTS

| | | | |
|---|---|---|---|
| 3,971,305 A | 7/1976 | Daswick | |
| 4,061,793 A | 12/1977 | Daswick | |
| 4,111,349 A | 9/1978 | Buckler et al. | |
| 4,826,723 A | 5/1989 | Brambach | |
| 4,983,410 A | 1/1991 | Dinos | |
| 5,300,576 A | 4/1994 | Nemphos et al. | |
| 5,325,765 A | 7/1994 | Sylvan et al. | |
| 5,348,983 A | 9/1994 | Sterzel | |
| 5,358,785 A | 10/1994 | Akao et al. | |
| 5,391,423 A | 2/1995 | Wnuk et al. | |
| 5,393,804 A | 2/1995 | George et al. | |
| 5,424,083 A | 6/1995 | Lozito | |

(Continued)

FOREIGN PATENT DOCUMENTS

CN 101003667 7/2007

(Continued)

OTHER PUBLICATIONS

Schimtz, Peter et al., "Films." Ullmann's Encyclopedia of Industrial Chemistry, 5th Ed., vol. All (1988), pp. 85-95, 105-106, 108-110.

*Primary Examiner* — N. Edwards
(74) *Attorney, Agent, or Firm* — Matthew M. Eslami

(57) ABSTRACT

The present invention is directed to a method of producing a thermoformable composite by crosslinking PHA and PLA together in the presence of an additive to produce PHA and PLA blend and resins having: (a) a $T_s$ value of up to about 180° C.; and (b) a heat distortion index of up to about 160° C. The thermoformable composite is used to make a food or beverage cup, lid, cutlery item, foodservice item, molded tray, or food storage container. The thermoformable composite comprises from about 5% to about 95% by weight of polylactic acid (PLA), from about 5% to about 95% by weight polyhydroxyalkanoate (PHA) polymer, and from about 0.01% to about 60% additives wherein the PLA and PHAs being crosslink together by intermolecular means to enhance performance and processability.

14 Claims, 3 Drawing Sheets

U.S. PATENT DOCUMENTS

| | | |
|---|---|---|
| 5,424,346 A | 6/1995 | Sinclair |
| 5,449,708 A | 9/1995 | Schiltz |
| 5,589,518 A | 12/1996 | Bastioli et al. |
| 5,698,612 A | 12/1997 | Simon et al. |
| 5,703,160 A | 12/1997 | Dehennau et al. |
| 5,763,098 A | 6/1998 | Kameoka et al. |
| 5,804,020 A | 9/1998 | Akao et al. |
| 5,817,721 A | 10/1998 | Warzelhan et al. |
| 5,840,189 A | 11/1998 | Sylvan et al. |
| 5,847,011 A | 12/1998 | Terado et al. |
| 5,849,374 A | 12/1998 | Gruber et al. |
| 5,849,401 A | 12/1998 | El-Afandi et al. |
| 6,011,092 A | 1/2000 | Seppala et al. |
| 6,025,417 A | 2/2000 | Willett et al. |
| 6,080,478 A | 6/2000 | Karhuketo |
| 6,117,925 A | 9/2000 | Tomka |
| 6,124,384 A | 9/2000 | Shiraishi et al. |
| 6,153,276 A | 11/2000 | Oya et al. |
| 6,156,929 A | 12/2000 | Chandler et al. |
| 6,191,203 B1 | 2/2001 | Asrar et al. |
| 6,211,325 B1 | 4/2001 | Sun et al. |
| 6,312,823 B1 | 11/2001 | El-Afandi et al. |
| 6,326,440 B1 | 12/2001 | Terada et al. |
| 6,346,599 B1 | 2/2002 | Goldberg et al. |
| 6,372,440 B2 | 4/2002 | Wells |
| 6,426,128 B1 | 7/2002 | Kimmel et al. |
| 6,458,858 B1 | 10/2002 | Braun et al. |
| 6,509,440 B1 | 1/2003 | Sakane |
| 6,552,124 B2 | 4/2003 | Wang et al. |
| 6,559,244 B1 | 5/2003 | Sodergard et al. |
| 6,573,340 B1 | 6/2003 | Khemani et al. |
| 6,579,934 B1 | 6/2003 | Wang et al. |
| 6,619,188 B1 | 9/2003 | Meador |
| 6,632,923 B1 | 10/2003 | Lees et al. |
| 6,645,537 B2 | 11/2003 | Sweeney et al. |
| 6,655,260 B2 | 12/2003 | Lazaris et al. |
| 6,740,345 B2 | 5/2004 | Cai |
| 6,787,245 B1 | 9/2004 | Hayes |
| 6,840,153 B2 | 1/2005 | Wirth et al. |
| 6,869,985 B2 | 3/2005 | Mohanty et al. |
| 7,015,269 B1 | 3/2006 | Grutke et al. |
| 7,025,980 B1 | 4/2006 | Williams et al. |
| 7,081,263 B2 | 7/2006 | Albrecht |
| 7,087,313 B2 | 8/2006 | Sawai et al. |
| 7,132,490 B2 | 11/2006 | Obuchi et al. |
| 7,160,977 B2 | 1/2007 | Hale et al. |
| 7,172,814 B2 | 2/2007 | Hodson |
| 7,173,744 B1 | 2/2007 | Whiteside et al. |
| 7,176,349 B1 | 2/2007 | Dhugga et al. |
| 7,208,535 B2 | 4/2007 | Asrar et al. |
| 7,235,287 B2 | 6/2007 | Egawa |
| 7,256,223 B2 | 8/2007 | Mohanty et al. |
| 7,267,974 B2 | 9/2007 | Kozaki et al. |
| 7,276,361 B2 | 10/2007 | Doi et al. |
| 7,332,214 B2 | 2/2008 | Ozasa et al. |
| 7,378,015 B2 | 5/2008 | Rinker et al. |
| 7,619,025 B2 | 11/2009 | Mohanty et al. |
| 7,652,106 B2 | 1/2010 | Yamaguchi |
| 7,678,444 B2 * | 3/2010 | Tedford et al. ............... 428/212 |
| 7,770,512 B2 | 8/2010 | Albrecht |
| 7,793,585 B2 | 9/2010 | Rasmussen et al. |
| 2001/0047724 A1 | 12/2001 | Lazaris et al. |
| 2001/0048957 A1 | 12/2001 | Lazaris et al. |
| 2002/0198332 A1 | 12/2002 | Kasemura et al. |
| 2003/0038405 A1 | 2/2003 | Bopp et al. |
| 2003/0051981 A1 | 3/2003 | Trieb |
| 2003/0118692 A1* | 6/2003 | Wang et al. ............... 426/6 |
| 2003/0166748 A1 | 9/2003 | Khemani et al. |
| 2004/0054051 A1 | 3/2004 | Ouchi et al. |
| 2005/0054813 A1 | 3/2005 | Bastioli |
| 2005/0090625 A1 | 4/2005 | Bastioli et al. |
| 2005/0163944 A1 | 7/2005 | Isshiki et al. |
| 2005/0244606 A1 | 11/2005 | Egawa |
| 2006/0036062 A1 | 2/2006 | Ramakrishna et al. |
| 2006/0040119 A1 | 2/2006 | Egawa |
| 2006/0100395 A1 | 5/2006 | Aritake |
| 2006/0160984 A1 | 7/2006 | Nagasawa et al. |
| 2006/0269710 A1 | 11/2006 | Inglis |
| 2007/0092712 A1 | 4/2007 | Hodson |
| 2007/0092745 A1 | 4/2007 | Nie et al. |
| 2007/0129467 A1 | 6/2007 | Scheer |
| 2007/0148384 A1 | 6/2007 | Bowden et al. |
| 2009/0274920 A1* | 11/2009 | Li et al. ............... 428/481 |
| 2011/0073607 A1 | 3/2011 | Fu et al. |
| 2011/0135863 A1* | 6/2011 | Li et al. ............... 428/36.92 |
| 2011/0136978 A1 | 6/2011 | Li et al. |
| 2011/0214284 A1* | 9/2011 | Xu et al. ............... 29/825 |
| 2012/0097602 A1 | 4/2012 | Tedford |

FOREIGN PATENT DOCUMENTS

| | | |
|---|---|---|
| CN | 101045810 | 10/2007 |
| CN | 101205356 | 6/2008 |
| EP | 1236753 | 9/2002 |
| EP | 1440904 | 6/2005 |
| EP | 1440905 | 6/2005 |
| EP | 1541345 | 6/2005 |
| EP | 1440903 | 3/2006 |
| EP | 1630195 | 3/2006 |
| EP | 1440911 | 5/2006 |
| EP | 1440910 | 6/2006 |
| EP | 1440906 | 3/2007 |
| EP | 1440907 | 3/2007 |
| EP | 1440914 | 3/2007 |
| EP | 1911809 | 4/2008 |
| EP | 2025713 | 2/2009 |
| EP | 1440636 | 12/2009 |
| EP | 1440909 | 11/2010 |
| FR | 2918383 | 1/2009 |
| JP | 9111107 | 4/1997 |
| JP | 2001347623 | 12/2001 |
| JP | 2002127343 | 5/2002 |
| JP | 2003291294 | 10/2003 |
| JP | 2005119061 | 5/2005 |
| JP | 2005119062 | 5/2005 |
| JP | 2005255722 | 9/2005 |
| JP | 2006057197 | 3/2006 |
| JP | 2006169430 | 6/2006 |
| JP | 2006328138 | 12/2006 |
| JP | 2008030332 | 2/2008 |
| JP | 2008055694 | 3/2008 |
| KR | 2009086814 | 8/2009 |
| WO | 9820073 | 5/1998 |
| WO | 03051981 | 6/2003 |
| WO | 2004065225 | 8/2004 |
| WO | 2004065256 | 8/2004 |
| WO | 2004065257 | 8/2004 |
| WO | 2004065258 | 8/2004 |
| WO | 2004065259 | 8/2004 |
| WO | 2005080222 | 9/2005 |
| WO | 2006014936 | 2/2006 |
| WO | 2007095709 | 8/2007 |
| WO | 2009094365 | 7/2009 |
| WO | 2010018540 | 2/2010 |
| WO | 2011041295 | 4/2011 |
| WO | 2011075638 | 6/2011 |

* cited by examiner

US 8,231,954 B2

THERMOFORMED ARTICLES MADE FROM REACTIVE EXTRUSION PRODUCTS OF BIOBASED MATERIALS

CROSS REFERENCE TO RELATED APPLICATIONS

This application claims priority to U.S. provisional patent application Ser. No. 61/267,651, filed on 8 Dec. 2009, which is hereby incorporated hereinto by reference as if fully restated herein.

FIELD OF THE INVENTION

The present invention broadly relates to articles comprising a thermoformable composite material comprising biobased and/or biodegradable polymers such as PHA, PLA, their blends and copolymers via extrusion. The products made by the present invention will be carried out by (reactive) extrusion of the resins, in the present of one or more additive(s) and/or catalyst(s).

BACKGROUND OF THE INVENTION

In recent years, there has been a notable interest in biobased and/or biodegradable materials for use in food packaging, agriculture, medicine, and other areas. For example, the poly lactic acid (PLA) made from corn starch by NatureWorks LLC, has been used to produce environmentally friendly products, like International Paper's ECOTAINER. The limited thermal and mechanical properties of virgin biopolymers, however, become the restriction of its applications. Petroleum chemicals, for example, PET, polypropylene, could be added into PLA to improve its performance. By combining Biopolymers, and/or biodegradable polymers, and/or natural fillers, and/or performance promoters or modifiers, we can have better products, while retain good sustainability. The Biopolymers are, but not limit to, PLA, PHA (polyhydroxyalkanoates), cellulose esters, polysaccharides, and so on. The performance promoters or modifiers here are, but not limit to, low molecule weight additives, like catalysts, crosslink agents, tie-agents, plasticizers, stabilizers, nucleating agents, some other polymers, and so on.

PLA is a biodegradable polymer that made from corn starch. Adding petroleum chemicals into PLA could improve the thermal and mechanical performance, but damages the sustainability of the products. By making PLA/biomaterial blends/composites, we can have better products, while retain their sustainability. The biomaterials here are, but not limited to, biopolymers, like PHAs; natural fillers, like cellulose fibers and powders; agriculture (for examples, rice husk, wheat bran, straw, corn cob . . . ) fibers and powders; wood fibers and powders; and bamboo fibers and powders.

Polylactic acid (PLA) is increasing in favor with consumers of plastic thermoformed articles as a renewable plastic which does not derive from fossil fuels and which is degradable in the environment. As with many thermoplastics, PLA has a decreasing mechanical strength with increasing temperature. At higher temperatures approaching about 140° F. (60° C.), an article formed from PLA may lose the ability to resist deformation by forces frequently found in transportation. At temperatures above about 140° F. (60° C.), PLA may lose its ability to resist deformation to forces of the order of magnitude of gravity and residual mold stress. Prolonged exposure of PLA articles to temperatures of about 140° F. (60° C.) or higher may cause these articles to deform substantially from their original shape under forces which may be present in storage conditions. Since temperatures of about 130° F. (54.4° C.) may be exceeded in railcars and trailers used for distribution, PLA articles may suffer from high damage losses during transport through and storage in hot areas such as tractor trailers crossing, for example, the hot weather areas of the United States during the summer season.

Accordingly, it would be desirable to produce PHAs-PLA blends containing articles which have greater resistance to deformation at higher temperatures that may occur during, for example, storage and transportation in hot summer time periods. The composites could be processed on the currently commercial plastic arts production line.

SUMMARY OF THE INVENTION

According to a first broad aspect of the present invention, there is provided an article comprising a thermoformable composite comprising: a thermoformable composite comprising PHAs-PLA based blends and copolymers via extrusion. The resulted materials comprises mixing PLA (1-99 wt %), PHAs (1-99 wt %), and additives (0.01-60 wt %), and then process them in an extruder. The additives are both radical and non-radical type chemicals. The reaction formulation is: ratio of starting materials: PLA (1-99 wt %), PHAs (1-99 wt %), additives (0.01-60 wt %). The goal is to link PHA and PLA together by intermolecular way such as, but not limiting to, tie molecules, and/or chemical bounding such as, but not limiting to cross-link, to obtain better performance and/or better processability. The composite products can then be used in thermoforming, injection molding, and extrusion coating.

According to a second broad aspect of the present invention, there is provided a method comprising the following steps of:
(1) providing PHAs-PLA blends and resins having: (a) a $T_s$ value of up to about 180° C.; and (a) a heat distortion index of up to about 160° C.;
(2) providing a heat-resistant polymer system having: (a) a $T_s$ of greater than about 60° C.; and (b) a heat distortion index greater than about 50° C., wherein the $T_s$ value and heat distortion index of the heat-resistant polymer is greater than that of the solo renewable polymer.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
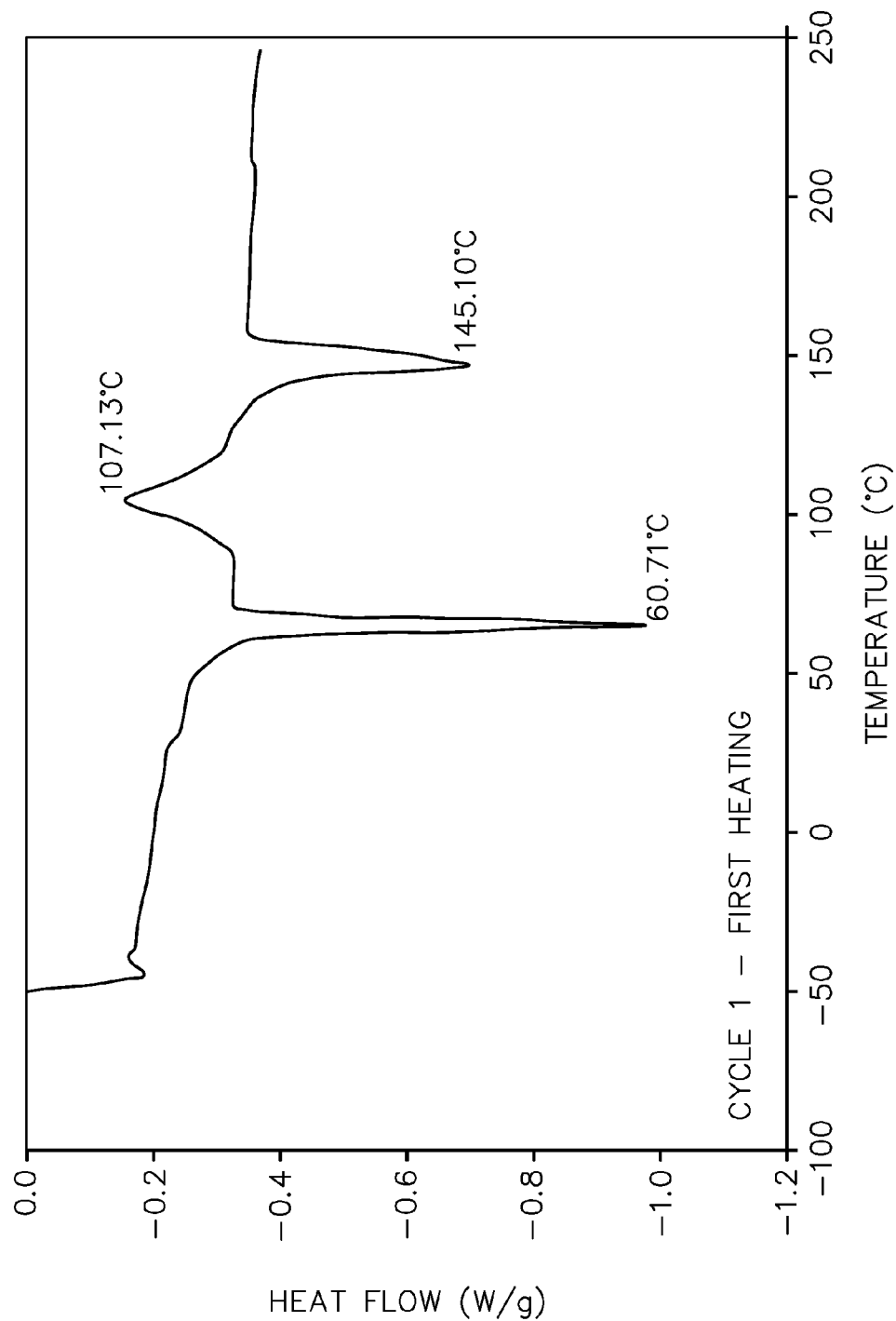
FIG. 1 is a graph that shows a typical Differential Scanning calorimetry (DSC) Spectrum of PLA illustrating melt temperature is at 145.10° C. and heat absorption peak at 60.71° C.

It is advantageous to define several terms before describing the invention. It should be appreciated that the following definitions are used throughout this application.

DEFINITIONS

Where the definition of terms departs from the commonly used meaning of the term, applicant intends to utilize the definitions provides below, unless specifically indicated.

For the purposes of the present invention, the term "renewable polymer" (also known as "biopolymer") refers to a polymer, or a combination (e.g., blend, mixture, etc.) of polymers, which may be obtained from renewable natural resources, e.g., from raw or starting materials which are or may be replenished within a few years (versus, for example, petroleum which requires thousands or millions of years). For example, a renewable polymer may include a polymer that may be obtained from renewable monomers, polymers which may be obtained from renewable natural sources (e.g., starch, sugars, lipids, corn, sugar beet, wheat, other, starch-rich products etc.) by, for example, enzymatic processes, bacterial fermentation, other processes which convert biological materials into a feedstock or into the final renewable polymer, etc. See, for example, U.S. Pat. App. No. 20060036062 (Ramakrishna et al.), published Feb. 16, 2006, the entire disclosure and contents of which is hereby incorporated by reference. Renewable polymers useful in embodiments of the present invention may include polyhydroxyalkanoate (PHA) polymers, polycaprolactone (PCL) polymers, starch-based polymers, cellulose-based polymers, etc., or combinations thereof. Renewable polymers may, but do not necessarily include, biodegradable polymers.

For the purposes of the present invention, the term "biodegradable polymer" refers to a polymer which may be broken down into organic substances by living organisms, for example, microorganisms.

For the purposes of the present invention, the term "amorphous" refers to a solid which is not crystalline, i.e., has no lattice structure which is characteristic of a crystalline state.

For the purposes of the present invention, the term "crystalline" refers to a solid which has a lattice structure which is characteristic of a crystalline state.

For the purposes of the present invention, the term "high temperature deformation-resistant material" refers to a material which resists deformation at a temperature of about 140° F. (60° C.) or higher, for example, about 150° F. (65.6° C.) or higher.

For the purposes of the present invention, the term "high temperature deformable material" refers to a material which deforms at a temperature of less than about 140° F. (60° C.), for example, less than about 130° F. (54.4° C.).

For the purposes of the present invention, the term "thermoforming" refers to a method for preparing a shaped, formed, etc., article from a thermoplastic sheet, film, etc. In thermoforming, the sheet, film, etc., may be heated to its melting or softening point, stretched over or into a temperature-controlled, single-surface mold and then held against the mold surface until cooled (solidified). The formed article may then be trimmed from the thermoformed sheet. The trimmed material may be reground, mixed with virgin plastic, and reprocessed into usable sheet. Thermoforming may include vacuum forming, pressure forming, twin-sheet forming, drape forming, free blowing, simple sheet bending, etc.

For the purposes of the present invention, the term "thermoform" and similar terms such as, for example "thermoformed," etc., refers to articles made by a thermoforming method.

For the purposes of the present invention, the term "melting point" refers to the temperature range at which a crystalline material changes state from a solid to a liquid, e.g., may be molten. While the melting point of material may be a specific temperature, it often refers to the melting of a crystalline material over a temperature range of, for example, a few degrees or less. At the melting point, the solid and liquid phase of the material often exist in equilibrium.

For the purposes of the present invention, the term "$T_m$" refers to the melting temperature of a material, for example, a polymer. The melting temperature is often a temperature range at which the material changes from a solid state to a liquid state. The melting temperature may be determined by using a differential scanning calorimeter (DSC) which determines the melting point by measuring the energy input needed to increase the temperature of a sample at a constant rate of temperature change, and wherein the point of maximum energy input determines the melting point of the material being evaluated.

For the purposes of the present invention, the term "softening point" refers to a temperature or range of temperatures at which a material is or becomes shapeable, moldable, formable, deformable, bendable, extrudable, etc. The term softening point may include, but does not necessarily include, the term melting point.

For the purposes of the present invention, the term "$T_s$" refers to the Vicat softening point (also known as the Vicat Hardness). The Vicat softening point is measured as the temperature at which a polymer specimen is penetrated to a depth of 1 mm by a flat-ended needle with a 1 sq. mm circular or square cross-section. A load of 9.81 N is used. Standards for measuring Vicat softening points for thermoplastic resins may include JIS K7206, ASTM D1525 or ISO306, which are incorporated by reference herein.

For the purposes of the present invention, the term "$T_g$" refers to the glass transition temperature. The glass transition temperature is the temperature: (a) below which the physical properties of amorphous materials vary in a manner similar to those of a solid phase (i.e., a glassy state); and (b) above which amorphous materials behave like liquids (i.e., a rubbery state).

For the purposes of the present invention, the term "heat deflection temperature (HDT)" or heat distortion temperature (HDTUL) (collectively referred to hereafter as the "heat distortion index (HDI)") is the temperature at which a polymer deforms under a specified load. HDI is a measure of the resistance of the polymer to deformation by heat and is the temperature (in ° C.) at which deformation of a test sample of the polymer of predetermined size and shape occurs when subjected to a flexural load of a stated amount. HDI may be determined by following the test procedure outlined in ASTM D648, which is herein incorporated by reference. ASTM D648 is a test method which determines the temperature at which an arbitrary deformation occurs when test samples are subjected to a particular set of testing conditions. This test provides a measure of the temperature stability of a material, i.e., the temperature below which the material does not readily deform under a standard load condition. The test sample is loaded in three-point bending device in the edgewise direction. The outer fiber stress used for testing is 1.82 MPa, and the temperature is increased at 2° C./min until the test sample deflects 0.25 mm.

For the purposes of the present invention, the term "melt flow index (MFI)" (also known as the "melt flow rate (MFR))" refers to a measure of the ease of flow of the melt of a thermoplastic polymer, and may be used to determine the ability to process the polymer in thermoforming. MFI may be defined as the weight of polymer (in grams) flowing in 10 minutes through a capillary having a specific diameter and length by a pressure applied via prescribed alternative gravimetric weights for alternative prescribed temperatures. Standards for measuring MFI include ASTM D1238 and ISO 1133, which are herein incorporated by reference. The testing temperature used is 190° C. with a loading weight of 2.16 kg. For thermoforming according to embodiments of the present invention, the MFI of the polymers may be in the range from 0 to about 20 grams per 10 minutes, for example from 0 to about 15 grams per 10 minutes.

For the purposes of the present invention, the terms "viscoelasticity" and "elastic viscosity" refer interchangeably to a property of materials which exhibit both viscous and elastic characteristics when undergoing deformation. Viscous materials resist shear flow and strain linearly with time when a stress is applied, while elastic materials strain instantaneously when stretched and just as quickly return to their original state once the stress is removed. Viscoelastic materials have elements of both of these properties and, as such, exhibit time dependent strain. Whereas elasticity is usually the result of bond stretching along crystallographic planes in an ordered solid, viscoelasticity is the result of the diffusion of atoms or molecules inside of an amorphous material.

For the purposes of the present invention, the term "hydroxy aliphatic acids" refers to organic aliphatic carboxylic acids having a hydroxy group, and which may be used to provide polyhydroxyalkanoates. Hydroxy aliphatic acids useful herein may include lactic acid, hydroxy-beta-butyric acid (also known as hydroxy-3-butyric acid), hydroxy-alpha-butyric acid (also known as hydroxy-2-butyric acid), 3-hydroxypropionic acid, 3-hydroxyvaleric acid, 4-hydroxybutyric acid, 4-hydroxyvaleric acid, 5-hydroxyvaleric acid, 3-hydroxyhexanoic acid, 4-hydroxyhexanoic acid, 6-hydroxyhexanoic acid, hydroxyacetic acid (also known as glycolic acid), lactic acid (also know as hydroxy-alpha-propionic acid), malic acid (also known as hydroxysuccinic acid), etc., and mixtures thereof.

For the purposes of the present invention, the term "polyhydroxyalkanoate (PHA) polymer" refers broadly to renewable, thermoplastic aliphatic polyesters which may be produced by polymerization of the respective monomer hydroxy aliphatic acids (including dimers of the hydroxy aliphatic acids), by bacterial fermentation of starch, sugars, lipids, etc. PHA polymers may include poly-beta-hydroxybutyrate (PHB) (also known as poly-3-hydroxybutyrate), poly-alpha-hydroxybutyrate (also known as poly-2-hydroxybutyrate), poly-3-hydroxypropionate, poly-3-hydroxyvalerate, poly-4-hydroxybutyrate, poly-4-hydroxyvalerate, poly-5-hydroxyvalerate, poly-3-hydroxyhexanoate, poly-4-hydroxyhexanoate, poly-6-hydroxyhexanoate, polyhydroxybutyratevalerate (PHBV), polyglycolic acid, polylactic acid (PLA), etc., as well as PHA copolymers, blends, mixtures, combinations, etc., of different PHA polymers, etc. PHA may be synthesized by methods disclosed in, for example, U.S. Pat. No. 7,267,794 (Kozaki et al.), issued Sep. 11, 2007; U.S. Pat. No. 7,276,361 (Doi et al.), issued Oct. 2, 2007; U.S. Pat. No. 7,208,535 (Asrar et al.), issued Apr. 24, 2007; U.S. Pat. No. 7,176,349 (Dhugga et al.), issued Feb. 13, 2007; and U.S. Pat. No. 7,025,908 (Williams et al.), issued Apr. 11, 2006, the entire disclosure and contents of the foregoing documents being herein incorporated by reference.

For the purposes of the present invention, the term "polylactic acid or polylactide (PLA)" refers to a renewable, biodegradable, thermoplastic, aliphatic polyester formed from a lactic acid or a source of lactic acid, for example, renewable resources such as corn starch, sugarcane, etc. The term PLA may refer to all stereoisomeric forms of PLA including L- or D-lactides, and racemic mixtures comprising L- and D-lactides. For example, PLA may include D-polylactic acid, L-polylactic acid (also known as PLLA), D,L-polylactic acid, meso-polylactic acid, as well as any combination of D-polylactic acid, L-polylactic acid, D,L-polylactic acid and meso-polylactic acid. PLAs useful herein may have, for example, a number average molecular weight in the range of from about 15,000 and about 300,000. In preparing PLA, bacterial fermentation may be used to produce lactic acid, which may be oligomerized and then catalytically dimerized to provide the monomer for ring-opening polymerization. PLA may be prepared in a high molecular weight form through ring-opening polymerization of the monomer using, for example, a stannous octanoate catalyst, tin(II) chloride, etc.

For the purposes of the present invention, the term "cellulose-based polymer" refers to a polymer, or combination of polymers, which may be derived from, prepared from, etc., cellulose. Cellulose-based polymers which may be used in embodiments of the present invention may include, for example, cellulose esters, such as cellulose formate, cellulose acetate, cellulose diacetate, cellulose propionate, cellulose butyrate, cellulose valerate, mixed cellulose esters, etc., and mixtures thereof.

For the purposes of the present invention, the term "mineral filler" refers to inorganic materials, often in particulate form, which may lower cost (per weight) of the polymer, and which, at lower temperatures, may be used to increase the stiffness and decrease the elongation to break of the polymer, and which, at higher temperatures, may be used to increase the viscosity of the polymer melt. Mineral fillers which may used in embodiments of the present invention may include, for example, talc, calcium chloride, titanium dioxide, clay, synthetic clay, gypsum, calcium carbonate, magnesium carbonate, calcium hydroxide, calcium aluminate, magnesium carbonate mica, silica, alumina, sand, gravel, sandstone, limestone, crushed rock, bauxite, granite, limestone, glass beads, aerogels, xerogels, fly ash, fumed silica, fused silica, tabular alumina, kaolin, microspheres, hollow glass spheres, porous ceramic spheres, ceramic materials, pozzolanic materials, zirconium compounds, xonotlite (a crystalline calcium silicate gel), lightweight expanded clays, perlite, vermiculite, hydrated or unhydrated hydraulic cement particles, pumice, zeolites, exfoliated rock, etc., and mixtures thereof.

For the purposes of the present invention, the term "molded" refers to any method for casting, shaping, forming, extruding, etc., softened or melted polymers, layers, composites, etc., of the present invention.

For the purposes of the present invention, the term "blow molded" refers to a method of molding in which the material is melted and extruded into a hollow tube (also referred to as a parison). This parison may then be captured by closing it into a cooled mold and air is then blown into the parison, thus inflating parison into the shaped article. After the shaped article has cooled sufficiently, the mold is opened and the article is released (e.g., ejected).

For the purposes of the present invention, the term "compression molded" refers to a method of molding in which the molding material, with optional preheating, is first placed in an open, heated mold cavity. The mold is closed with a top force or plug member, pressure is applied to force the material into contact with all mold areas, and heat and pressure are maintained until the molding material has cured.

For the purposes of the present invention, the term "heat-resistant polymer" refers to a polymer (or polymers) which has an HDI value of greater than about 50° C., for example greater than about 65° C. (e.g., greater than about 90° C.). In other words, heat-resistant polymers are resistant to deformation at temperatures above about 50° C., for example, above about 65° C. (e.g., above about 90° C.). Heat-resistant polymers may or may not renewable polymers and may include polyolefins (e.g., polyethylene, polypropylene, etc.), polystyrenes, polyesters, polyamides, polyimides, polyurethanes, cellulose-based polymers, such as cellulose propionate, etc., and combinations thereof.

For the purposes of the present invention, the term "sheet" refers to webs, strips, films, pages, pieces, segments, etc., which may be continuous in form (e.g., webs) for subsequent subdividing into discrete units, or which may be in the form of discrete units (e.g., pieces).

For the purposes of the present invention, the term "extrusion" refers to a method for shaping, molding, forming, etc., a material by forcing, pressing, pushing, etc., the material through a shaping, forming, etc., device having an orifice, slit, etc., for example, a die, etc. Extrusion may be continuous (producing indefinitely long material) or semi-continuous (producing many short pieces, segments, etc.).

For the purposes of the present invention, the term "interpenetrating network" refers to where two adjacent areas, domains, regions, layers, etc., merge, combine, unite, fuse, etc., together so that there is essentially no boundary therebetween.

For the purposes of the present invention, the term "thermoplastic" refers to the conventional meaning of thermoplastic, i.e., a composition, compound, material, etc., that exhibits the property of a material, such as a high polymer, that softens when exposed to sufficient heat and generally returns to its original condition when cooled to room temperature. Thermoplastics may include, but are not limited to, polyesters (e.g., polyhydroxyalkanoates, polyethyleneterephthalate, etc.), poly(vinylchloride), poly(vinyl acetate), polycarbonates, polymethylmethacrylate, cellulose esters, poly(styrene), poly(ethylene), poly(propylene), cyclic olefin polymers, poly(ethylene oxide), nylons, polyurethanes, protein polymers, etc.

For the purposes of the present invention, the term "plasticizer" refers to the conventional meaning of this term as an agent which softens a polymer, thus providing flexibility, durability, etc. Plasticizers may be advantageously used in amounts of, for example, from about 0.01 to about 45% by weight, e.g., from about 3 to about 15% by weight of the polymer, although other concentrations may be used to provide desired flexibility, durability, etc. Plasticizers which may used in embodiments of the present invention include, for example, aliphatic carboxylic acids, aliphatic carboxylic acid metal salts, aliphatic esters, aliphatic amides, alkyl phosphate esters, dialkylether diesters, dialkylether esters, tricarboxylic esters, epoxidized oils and esters, polyesters, polyglycol diesters, alkyl alkylether diesters, aliphatic diesters, alkylether monoesters, citrate ester, dicarboxylic esters, vegetable oils and their derivatives, esters of glycerine, ethers, etc., and mixtures thereof. For example, with starch-based polymers (e.g., plant starch), the plasticizers may include one or more aliphatic acids (e.g., oleic acid, linoleic acid, stearic acid, palmitic acid, adipic acid, lauric acid, myristic acid, linolenic acid, succinic acid, malic acid, cerotic acid, etc.), one or more low molecular weight aliphatic polyesters, one or more aliphatic amides (e.g., oleamide, stearamide, linoleamide, cycle-n-lactam, $\epsilon$-caprolactam, lauryl lactam, N,N-dibutyl stearamide, N,N-dimethyl oleamide, etc.), one or more aliphatic carboxylic acid esters (e.g., methoxyethyl oleate, diisooctyl sebacate, bis(2-butoxyethyl) adipate, dibenzyl sebacate, isooctyl-isodecyl adipate, butyl epoxy fatty acid ester, epoxidized butyl acetoricinoleate, and low molecule weight (300-1200) poly(1,2-propylene glycol adipate, etc.), one or more aliphatic carboxylic acid metal salts (e.g., magnesium oleate, ferrous oleate, magnesium stearate, ferrous stearate, calcium stearate, zinc stearate, magnesium stearate, zinc stearate pyrrolidone, etc.) See published PCT Pat App. No. 2003/051981 (Wang et al.), published Jun. 26, 2003, the entire disclosure and contents of which are hereby incorporated by reference.

For the purposes of the present invention, the term "compatibilizer" refers to a composition, compound, etc., used to enhance reextrusion of polymer(s), plastic trim, etc., in thermoforming recycle operations by causing what may be two or more dissimilar polymers to provide a homogeneous, or more homogeneous, melt during reextrusion, and to avoid or minimize disassociation when recycled material is added back to the polymer feedstock being extruded. Compatibilizers which may be used in embodiments of the present invention include, for example, polyolefins, polybutadienes, polystyrenes, etc., modified with maleic anhydride, citrates of fatty acids, glycerol esters, etc. The compatibilizer may be advantageously used in amounts from about 0.005 to about 10% by weight, for example from about 0.01 to about 5% by weight of the polymer, although other concentrations may be used so long as they are effective at keeping the two or more polymers miscible and more homogeneous. Maleated polyolefins/polybutadienes/polystyrenes are commercially available compatibilizers, sold by Eastman (EPOLENES®), Crompton (POLYBONDS®), Honeywell (A-C®), and Sartomer (Ricons®). Maleated and epoxidized rubbers, derived from natural rubbers, may also be useful as compatibilizers, for example, maleic anhydride grafted rubber, epoxy/hydroxyl functionalized polybutadiene, etc. Other carboxylic acid modified polyolefin copolymers, such as those from succinic anhydride, may also be used. Monomers such as maleic anhydride, succinic anhydride, etc., may also be added directly along with or without other commercial compatibilizers to prepare in situ compatabilized blends. See U.S. Pat. No. 7,256,223 (Mohanty et al.), issued Aug. 14, 2007, the entire disclosure and contents of which is hereby incorporated by reference. Other useful compatibilizers may include poly(2-alkyl-2-oxazolines), such as, for example, poly(2-ethyl-2-oxazoline) (PEOX), poly(2-propionyl-2-oxazoline), poly(2-phenyl-2-oxazolone), etc. See U.S. Pat. No. 6,632,923 (Zhang et al.), issued Oct. 14, 2003, the entire disclosure and contents of which is hereby incorporated by reference. These compatibilizers may be included singly or as combinations of compatibilizers. For example, with starch-based polymers (e.g., plant starch), the compatibilizers may include one or more products (or complexes) of co-monomers and anhydrides (or their derivatives) at, for example, a 1:1 mole ratio), wherein the co-monomer may include one or more of: acrylonitrile, vinyl acetate, acrylamide, acrylic acid, glutaric acid, methacrylate, styrene, etc., and wherein the anhydride (or derivative) may include one or more of: acetic anhydride, methacrylic acid anhydride, succinic anhydride, maleic anhydride, maleimide, etc. See published PCT Pat App. No. 2003/051981 (Wang et al.), published Jun. 26, 2003, the entire disclosure and contents of which are hereby incorporated by reference.

For the purposes of the present invention, the term "significant weight amount" refers to an amount of the renewable polymer which may be at least about 50% by weight of the composite, for example, at least about 80% by weight, (e.g., at least about 90% by weight) of the composite.

DESCRIPTION

Much work has been done on modifying PLA to survive storage and distribution conditions involving higher temperatures (e.g., above about 140° F. (60° C.)) that may cause deformation of articles comprising PLA due to gravity, residual mold stress, etc. Modification methods have included the addition of mineral fillers (talc, calcium carbonate, or nanoclay) to PLA or small amounts of fossil fuel resins and adjuvants. These methods may improve the performance of the PLA-containing articles in heat distortion test apparatus, but may also do little to improve the performance of these articles during higher temperature storage or transportation. The use of additives with the PLA may be ineffective where the overall blend has PLA as a continuous phase. The mechanical strength of the PLA articles under slow temperature changes and small strain rates may be dominated by the strength of the continuous phase. While heat distortion temperature may be a widely used analysis method throughout the plastics industry, it has different mechanical conditions which may not be relevant to the storage condition issue.

In embodiments of the present invention, articles comprising a thermoformable composite are provided which comprise: a renewable polymer having: (a) a $T_s$ value of up to about 180° C. (e.g., in the range of from about 80° to about 170° C.); (b) a heat distortion index of up to about 160° C. (e.g., up to about 60° C., for example, up to about 150° C.); and (c) optionally, a $T_m$ in the range of from about 90° to about 200° C. (e.g., in the range of from about 95° to about −160° C.). The $T_s$ value, heat distortion index (and optionally $T_m$) of the heat-resistant polymer is also greater than that of the renewable polymer, for example, the heat-resistant polymer has a $T_s$ value, heat distortion index (and optionally $T_m$) at least about 5° C. greater (e.g., at least about 10° C. greater) than that of the renewable polymer. The renewable polymer comprises at least about 60% by weight (e.g., at least about 80% by weight, for example, at least about 90% by weight) of the composite. Such articles provide the ability to resist deformation during higher temperature conditions that may occur during storage and distribution.

In one embodiment of the present invention, the product may comprise one or more plasticizers, one or more compatibilizers, one or more other polymers, etc. For example, the layer may comprise PLA (1-99 wt %), PHAs (1-99 wt %), and additives (0.01-60 wt %). The performance promoters or modifiers here are, but not limit to, low molecule weight additives, like catalysts, crosslink agents, tie-agents, plasticizers, stabilizers, nucleating agents, some other polymers, and so on.

The range of polylactic acid (PLA) can be varied widely, but in the preferred embodiment of the invention, the PLA range is from about 10 wt % to about 90 wt % by weight of polylactic acid (PLA), more preferably from about 25 wt % to about 75 wt % by weight of polylactic acid (PLA), and most preferably from about 40 wt % to about 60 wt % by weight of polylactic acid (PLA). This range may include, but not limited to, 10, 20, 30, 40, 50, 60, 70, 80, and 90 wt % of the total thermoformable composite.

The range of polyhydroxyalkanoate (PHA) polymer can be varied widely, but in the preferred embodiment of the invention, the PHA range is from about 10 wt % to about 90 wt % by weight of polyhydroxyalkanoate (PHA) polymer, more preferably from about 25 wt % to about 75 wt % by weight of polyhydroxyalkanoate (PHA) polymer, and most preferably from about 40 wt % to about 60 wt % by weight of polyhydroxyalkanoate (PHA) polymer. This range may include, but not limited to, 10, 20, 30, 40, 50, 60, 70, 80, and 90 wt % of the total thermoformable composite.

The range of additives can be varied widely, but in the preferred embodiment of the invention, the additives is less than 60 wt % by the total weight of the thermoformable composite, more preferably is less than 30 wt % by total weight of the thermoformable composite, and most preferably is less than 5 wt % by weight of the total thermoformable composite. This range may include, but not limited to, 0.01, 0.05, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, and 55 wt % of the total thermoformable composite.

One embodiment of the present invention may be a thermoformed article such as a food or beverage cup, lid, cutlery item, foodservice item, molded tray, food storage container, etc. Another embodiment of the present invention may be an article in the form of a thermoformed sheet of the resulted heat-resistant polymer. Another embodiment of the present invention may be an article wherein the resin comprises a renewable polyhydroxyalkanoate polymer which may contain chain branching moieties or wherein the resin comprises other additives, such as plasticizers, compatibilizers, etc., to change the properties of the blend. Another embodiment of the present invention may be an article wherein the resin may comprise one or more mineral fillers, for example, talc, calcium chloride, titanium dioxide, clay, etc., or mixtures thereof.

In embodiments of the present invention, a thermoformable composite may be provided by extruding a heat-resistant polymer having the above defined $T_s$, heat distortion index, and optional $T_m$ values, and renewable polymer having the above defined $T_s$, heat distortion index and optional $T_m$ values, wherein the renewable polymer layer comprises a significant weight amount of the composite (for example, at least about 80% by weight). Articles such as, for example, a food or beverage cup, lid, cutlery item, foodservice item, molded tray, food storage container, etc., may then thermoformed from the composite structure.

Another embodiment of the present invention may be an article wherein the resin may comprise a compatibilizer which enhances reextrusion of polymer or plastic trim pieces obtained during trimming of the article which may be used in thermoforming recycle operations. Another embodiment of the present invention may be an article formed by compression molding or blow molding the thermoformable composite. Another embodiment of the present invention may be an article formed from a coextruded sheet from a roll fed through thermoforming operation, for example, with inline extrusion and thermoforming with recycle of trimmed polymer or plastic for regrinding.

Figure 3:
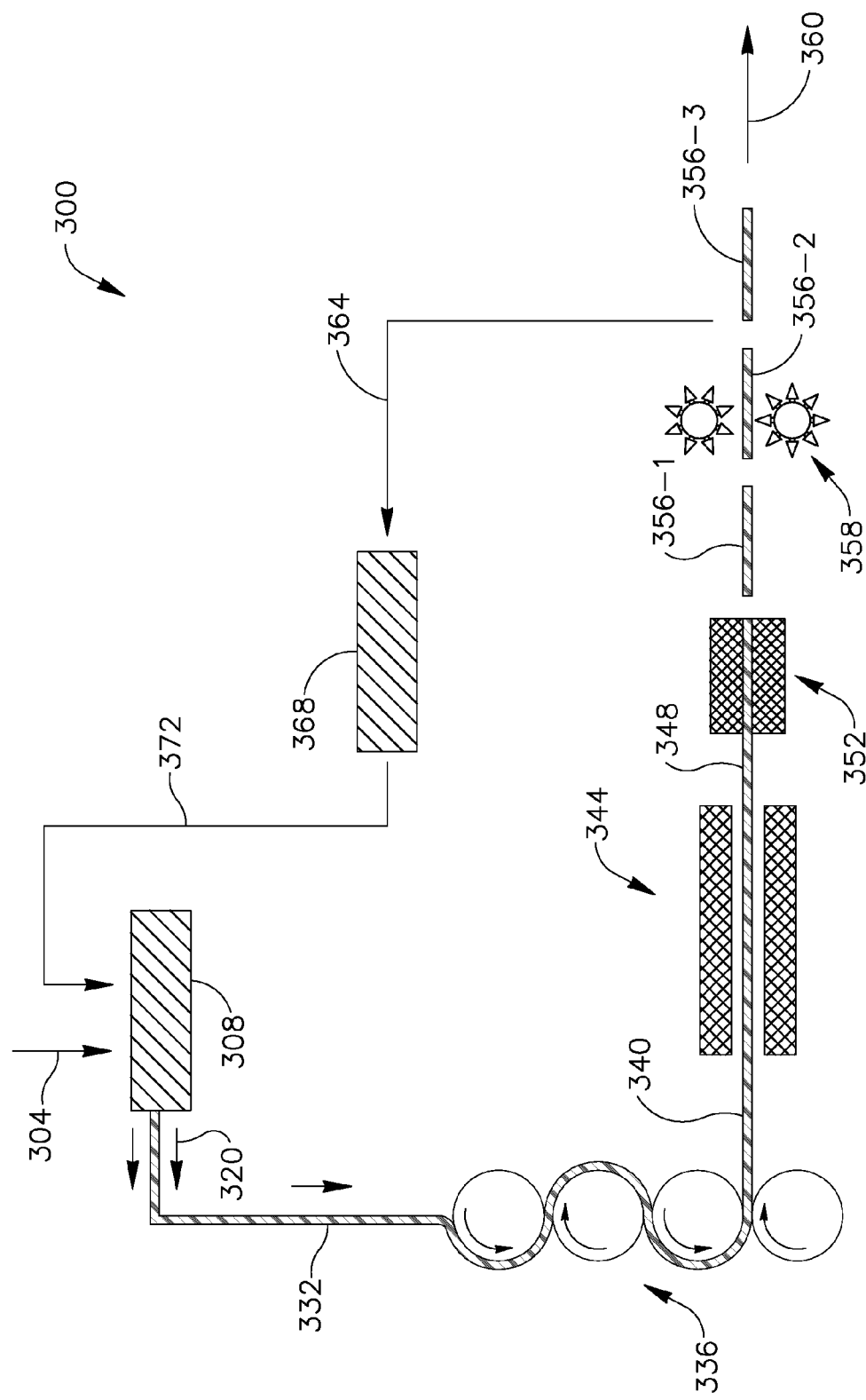
FIG. 3 is a thermoforming system, where pellets of a renewable polymer such as PLA-PHA blend, are added to the extruder.

An embodiment of the method of the present invention for preparing a thermoformed article is further schematically illustrated in FIG. 3 which shows thermoforming system, indicated generally as 300. In system 300, pellets of a renewable polymer such as PLA-PHA blend, are added, as indicated by arrow 304, to the extruder, indicated as 308, and processed at a temperature in the range of, for example, from about 130° to about 300° C. (e.g., from about 200° to about 225° C.).

The melted resin passes through a series chill rolls, indicated generally as 336. Cold web 340 passes through a remelt oven, indicated as generally 344, where cold web 340 is softened or melted at a temperature, for example, in the range of from about 100° to about 200° C. (e.g., from about 120° to about 180° C.), to provide a thermoformable web, indicated generally as 348. Thermoformable web 348 is passed through a thermoforming or molding section at a temperature, for example, in the range of from about 10° to about 100° C. (e.g., from about 20° to about 80° C.), indicated generally as 352, to provide a thermoformed or molded articles, of three are schematically shown and indicated as 356-1, 356-2 and 356-3. Thermoformed article 356-2 is shown as passing through a trimmer press 358 for remove excess material (e.g., flashing)

to provide finished article 356-3, which may then exits system 300, as indicated by arrow 360.

The trimmed material from article 356-2 may be recycled, as indicated by arrow 364. Recycled material 364 is sent to a chopper or grinder, indicated as 368, to provide size reduced recycled material. The size reduced recycled material is then returned, as indicated by arrow 372 for blending with PLA-PHA pellets in core extruder 308.

EXAMPLES

General formulations of composite polymers are shown in the following Tables 1 through 7:

PLA/PHA Formulas and Results

Resins and additives: The Polylactide (PLA) resins are produced by NatureWorks LLC. The Polyhydroxyalkanoate (PHA) resins are provided by Ningbo Tianan Biologic Material Co. The additives are obtained from DuPont Co., Sigma-Aldrich Co., AkzoNobel Corporate, Arkema Inc., and Specialty Minerals Inc. All the polymer resins are dried thoroughly before using.

TABLE 1

Blending of PLA and PHA with/without additives

| Run # | PLA | PHA | E243 | E283 | E285 | Temperature, C. | Speed | Torq. |
|---|---|---|---|---|---|---|---|---|
| A1 | 100.0 | | | | | 170 | low | 10.0 |
| A2 | 90.0 | 10.0 | | | | 170 | low | 8.5 |
| A3 | 85.0 | 10.0 | 5.0 | | | 170 | low | 8.5 |
| A4 | 80.0 | 20.0 | | | | 170 | low | 7.5 |
| A5 | 80.0 | 15.0 | 5.0 | | | 170 | low | 8.0 |
| A6 | 80.0 | 15.0 | | 5.0 | | 170 | low | 7.0 |
| A7 | 80.0 | 15.0 | 5.0 | | | 180 | low | 5.2 |
| A8 | 85.0 | 10.0 | 5.0 | | | 180 | low | 6.2 |
| A9 | 80.0 | 15.0 | | | 5.0 | 180 | low | 5.4 |
| A10 | 80.0 | 15.0 | 5.0 | | | 190 | low | 4.0 |
| A11 | 90.0 | | 10.0 | | | 190 | low | 6.0 |
| A12 | 80.0 | 15.0 | 5.0 | | | 180 | high | 5.8 |
| A13 | 90.0 | | 10.0 | | | 180 | high | 8.5 |
| A14 | 80.0 | 15.0 | 5.0 | | | 180 | low | 5.3 |

Table 1 contains blend information and twin screw extruder (a Haake PolyDrive Mixer, which is an extruder with two screws) processing conditions for the experimental blends tested. The PLA resin (2002D) is a product of NaturalWorks LLC. The PHA (1000P) is a product of Ningbo Tianan Biological Materials Co., Ltd., and the additives (E243, E283, and E285) are products of Arkema Inc.

TABLE 2

BioResin Formulation and Their Heat Resistance

| | Component | % | Extrusion Temp, F. | 200 F. test | Aging test |
|---|---|---|---|---|---|
| Formula PLHE24 | PLA | 52.0% | | | |
| | PHA | 38.0% | | | |
| | E243 | 10.0% | | | |
| | | | 380 | pass | pass |
| Formula PLHE28 | PLA | 52.0% | | | |
| | PHA | 38.0% | | | |
| | E283 | 10.0% | | | |
| | | | 350 | pass | pass |
| Formula PLHB120 | PLA | 52.0% | | | |
| | PHA | 38.0% | | | |
| | BS120 | 10.0% | | | |
| | | | 380 | pass | pass |
| Formula PLHL89 | PLA | 52.0% | | | |
| | PHA | 38.0% | | | |
| | LA89K | 10.0% | | | |
| | | | 350 | pass | pass |
| Formula PLHL34 | PLA | 52.0% | | | |
| | PHA | 38.0% | | | |
| | L3410 | 10.0% | | | |
| | | | 380 | fail | pass |
| Formula PSP80 | PSM102 | 80.0% | | | |
| | PP | 20.0% | | | |
| | | | 380 | pass | pass |

Table 2 contains blend information, twin screw extruder (a Brabender PS/6, which is an extruder with two screws) processing conditions, and testing results of the experimental blends. 200 F testing is to place the specimen into a 200° F. oven for 30 minutes, and the PASS means there is no deformation of the sample, and the FAIL means there is. The Aging test is to place the specimen into a 150° F. oven for 3 weeks, and the PASS means the sample doesn't turn brittle, and the FAIL means it does.

TABLE 3

More Formula of PHA/PLA Blends (by parts)

| Run # | PHA | PLA | BS120 | E243 | E285 | E283 | S3202 | L1706 |
|---|---|---|---|---|---|---|---|---|
| B1 | 45.00 | 45.00 | 10.00 | | | | | |
| B2 | 47.50 | 47.50 | 5.00 | | | | | |
| B3 | 63.00 | 27.00 | 10.00 | | | | | |
| B4 | 66.50 | 28.50 | 5.00 | | | | | |
| B5 | 45.00 | 45.00 | | 10.00 | | | | |
| B6 | 45.00 | 45.00 | | | 10.00 | | | |
| B7 | 45.00 | 45.00 | | | | 10.00 | | |
| B8 | 45.00 | 45.00 | | | | | 10.00 | |
| B9 | 45.00 | 45.00 | | | | | | 10.00 |
| B10 | 28.50 | 66.50 | | | | | 5.00 | |
| B11 | 28.50 | 66.50 | | | | | | 5.00 |
| MA-PLA*, PLA, % Starch-Glycerol (64:Starch-Glycerol (73:27) | | | | | | | | |
| B12 | 25.00 | 30.00 | 45.00 | | | | | |
| B13 | 25.00 | 30.00 | | 45.00 | | | | |
| B14 | 5.00 | 15.00 | 80.00 | | | | | |
| B15 | 12.00 | 38.00 | 50.00 | | | | | |
| B16 | 5.00 | 15.00 | | 80.00 | | | | |
| B17 | 12.00 | 38.00 | | 50.00 | | | | |

*MA-PLA: pla/ma/bpo = 97.5/2.0/0.5
Starch: Tate & Lyle Pearl Cron Starch

Table 3 contains blend information of PLA (NatureWorks 4042D), PHA (Tianan 1000P) and various additives on a twin screw extruder (a Brabender PS/6, which is an extruder with two screws), where MA is maleic anhydride, bpo is benzoyl peroxide (both are from Sigma-Aldrich Co.); BS120 is from DuPont Co., and all other additives are from Arkema Inc.

TABLE 4

More PLA/PHA Blends and Their Performance

| Run # | PLA | PHA | Trigonx 101 | E243 | BS120 | Talc | CaCO₃ | TiO₂ | Heat Score | Brittle Y/N |
|---|---|---|---|---|---|---|---|---|---|---|
| C1 | 64 | 24 | | | | 12 | | | | yes |
| C2 | 64 | 24 | | | | | 12 | | | no |
| C3 | 64 | 30 | | | | | | 6 | 50 | no |
| C4 | 44 | 44 | | | | 12 | | | 80 | yes |
| C5 | 44 | 44 | | | | | 12 | | 70 | yes |
| C6 | 44 | 50 | | | | | | 6 | 70 | no |
| C7 | 67 | 27 | | | 6 | | | | 60 | no |
| C8 | 67 | 27 | | | | | 6 | | 50 | no |
| C9 | 67 | 31 | | | | | | 2 | 60 | no |
| C10 | 47 | 47 | | | 6 | | | | 90 | yes |
| C11 | 47 | 47 | | | | | 6 | | 80 | yes |
| C12 | 47 | 51 | | | | | | 2 | 90 | no |
| C13 | 70 | 30 | 1.00 | | | | | | | yes |
| C14 | 60 | 40 | 1.00 | | | | | | | yes |
| C15 | 50 | 50 | 1.00 | | | | | | 50 | no |
| C16 | 70 | 30 | 0.50 | | | | | | | yes |
| C17 | 60 | 40 | 0.50 | | | | | | | yes |
| C18 | 50 | 50 | 0.50 | | | | | | 60 | yes |
| C19 | 70 | 30 | 0.50 | 1 | | | | | | no |
| C20 | 60 | 40 | 0.50 | 1 | | | | | | yes |
| C21 | 50 | 50 | 0.50 | 1 | | | | | 50 | yes |
| C22 | 70 | 30 | 0.50 | 3 | | | | | | no |
| C23 | 60 | 40 | 0.50 | 3 | | | | | | yes |
| C24 | 50 | 50 | 0.50 | 3 | | | | | | yes |
| C25 | 70 | 30 | 0.50 | | 1 | | | | | yes |
| C26 | 60 | 40 | 0.50 | | 1 | | | | | yes |
| C27 | 50 | 50 | 0.50 | | 1 | | | | | yes |
| C28 | 70 | 30 | 0.50 | | 3 | | | | | yes |
| C29 | 60 | 40 | 0.50 | | 3 | | | | | yes |
| C30 | 50 | 50 | 0.50 | | 3 | | | | 50 | yes |
| C31 | 48 | 48 | | | | 4 | | | 90 | yes |
| C32 | 48 | 48 | | | | | 4 | | 70 | yes |
| C33 | 48 | 48 | | | | | | 4 | 80 | yes |
| C34 | 48.5 | 48.5 | | | | | | 3 | 70 | yes |
| C35 | 47 | 51 | | | | 2 | | | 80 | yes |
| C36 | 47 | 51 | | | | | 2 | | 60 | yes |
| C37 | 47 | 51 | 0.20 | | | | | 2 | | yes |
| C38 | 48 | 48 | 0.20 | | | | 4 | | | yes |

Similar with Table 3, Table 4 shows the blend information of PLA (NatureWorks 4042D), PHA (Tianan 1000P) and various additives on a 34 mm Leistritz twin screw extruder, where Trigonox 101 is a AkzoNobel Corporate product; BS120 is from DuPont Co., E243 is from Arkema Inc., and all other additives are from Specialty Minerals Inc.

The Heat Score is determined by to immerse a 0.5 by 6.0 inches specimen into 190° F. water for one minute. The score 100 means the sample keeping 100% of strength, while 0 means the sample losing 100% of strength. A brittle sample indicates that the test specimen broken when being fold 180 degree at room temperature.

TABLE 5

More PLA/PHA Blends and Their Performance

| Sample # | PLA | PHA | Trigonox 101 | Trigonox 301 | Heat Score | Brittle |
|---|---|---|---|---|---|---|
| E-1 | 50.00 | 50.00 | 0.250 | 0.250 | 9 | Y |
| E-2 | 50.00 | 50.00 | 0.125 | 0.125 | 7 | Y/N |
| E-3 | 50.00 | 50.00 | 0.400 | 0.100 | 9 | Y |
| E-4 | 50.00 | 50.00 | 0.200 | 0.050 | 7 | Y/N |
| E-5 | 50.00 | 50.00 | 0.360 | 0.090 | 8 | Y |
| E-6 | 50.00 | 50.00 | 0.320 | 0.080 | 8 | Y |
| E-7 | 50.00 | 50.00 | 0.280 | 0.070 | 9 | Y- |
| E-8 | 55.00 | 45.00 | 0.400 | 0.100 | 7 | N |
| E-9 | 50.00 | 50.00 | 0.250 | 0.125 | 5 | N- |
| E-10 | 50.00 | 50.00 | 0.092 | 0.544 | 9 | N |
| E-11 | 55.00 | 45.00 | 0.320 | 0.150 | 8 | Y/N |
| E-12 | 60.00 | 40.00 | 0.320 | 0.150 | 5 | N |

Similar with Table 3, Table 5 shows the blend information of PLA (NatureWorks 4032D), PHA (Tianan 1000P) and various additives on a ZSK-40 twin screw extruder, where Trigonox 101 and Trigonox 301 are AkzoNobel Corporate products.

The Heat Score is determined by to immerse a 0.5 by 6.0 inches specimen into 190° F. water for one minute. The score 10 means the sample keeping 100% of strength, while 0 means the sample losing 100% of strength. A brittle sample indicates that the test specimen broken when being fold 180 degree at room temperature, 'Yes or No (Y/N)' means some samples broke and some didn't.

TABLE 6

PLA/PHA Blends and Their Performance

| Sample ID | PLA | PHA | Talc | Trigonox 101 | Trigonox 117 | Trigonox 131 | Heat Score | Brittleness week 1 |
|---|---|---|---|---|---|---|---|---|
| F-1 | 50.0% | 50.0% | | | | | 6 | n |
| F-2 | 48.5% | 48.5% | 2.91% | | | | 6 | n |
| F-3 | 49.8% | 49.8% | | 0.35% | | | 8 | n |
| F-4 | 49.9% | 49.9% | | 0.17% | | | 6 | n |
| F-5 | 49.8% | 49.8% | | 0.44% | | | 9 | n |
| F-6 | 49.9% | 49.9% | | 0.22% | | | 9 | n |
| F-7 | 49.8% | 49.8% | | 0.39% | | | 9 | n |
| F-8 | 49.8% | 49.8% | | 0.35% | | | 9 | y |
| F-9 | 49.8% | 49.8% | | 0.31% | | | 9 | n |
| F-10 | 54.8% | 44.8% | | 0.44% | | | 9 | n |
| F-11 | 49.9% | 49.9% | | 0.30% | | | 8 | y/n |
| F-12 | 49.8% | 49.8% | | 0.44% | | | 8 | n |
| F-13 | 49.8% | 49.8% | | 0.35% | | | 9 | n |
| F-14 | 54.8% | 44.8% | | 0.38% | | | 8 | y/n |
| F-15 | 59.8% | 39.8% | | 0.38% | | | 6 | n |
| F-16 | 69.7% | 29.9% | | | 0.50% | | 1 | n |
| F-17 | 59.7% | 39.8% | | | 0.50% | | 6 | n |
| F-18 | 49.8% | 49.8% | | | 0.50% | | 6 | n |
| F-19 | 39.8% | 59.7% | | | 0.50% | | 6 | n |
| F-20 | 38.6% | 58.0% | 2.90% | | 0.48% | | 9 | n |
| F-21 | 48.3% | 48.3% | 2.90% | | 0.48% | | 6 | n |
| F-22 | 58.0% | 38.6% | 2.90% | | 0.48% | | 2 | n |
| F-23 | 67.6% | 29.0% | 2.90% | | 0.48% | | 1 | n |
| F-24 | 50.0% | 50.0% | | | | | 6 | n |
| F-25 | 48.5% | 48.5% | 2.91% | | | | 9 | n |
| F-26 | 69.7% | 29.9% | | | 0.50% | | 1 | n |
| F-27 | 58.0% | 38.6% | 2.90% | | 0.48% | | 2 | n |
| F-28 | 69.7% | 29.9% | | | 0.50% | | 1 | n |
| F-29 | 59.7% | 39.8% | | | 0.50% | | 5 | n |
| F-30 | 49.8% | 49.8% | | | 0.50% | | 9 | n |
| F-31 | 39.8% | 59.7% | | | 0.50% | | 9 | n |
| F-32 | 38.6% | 58.0% | 2.90% | | 0.48% | | 9 | n |
| F-33 | 48.3% | 48.3% | 2.90% | | 0.48% | | 9 | n |
| F-34 | 58.0% | 38.6% | 2.90% | | 0.48% | | 6 | n |
| F-35 | 67.6% | 29.0% | 2.90% | | 0.48% | | 1 | n |
| F-36 | 39.8% | 59.7% | | | | 0.50% | 6 | n |
| F-37 | 49.8% | 49.8% | | | | 0.50% | 6 | n |
| F-38 | 59.7% | 39.8% | | | | 0.50% | 6 | n |
| F-39 | 69.7% | 29.9% | | | | 0.50% | 1 | n |
| F-40 | 67.6% | 29.0% | 2.90% | | | 0.48% | 1 | n |
| F-41 | 63.3% | 27.1% | 9.05% | | | 0.45% | 1 | n |
| F-42 | 58.0% | 38.6% | 2.90% | | | 0.48% | 2 | n |
| F-43 | 48.3% | 48.3% | 2.90% | | | 0.48% | 2 | n |
| F-44 | 48.4% | 48.4% | 2.90% | | | 0.29% | 6 | n |
| F-45 | 48.3% | 48.3% | 2.90% | | | 0.48% | 6 | n |
| F-46 | 38.6% | 58.0% | 2.90% | | | 0.48% | 9 | n |
| F-47 | 9.7% | 87.2% | 2.91% | | | 0.24% | 6 | n |
| F-48 | 9.7% | 87.0% | 2.90% | | | 0.48% | 9 | n |

Similar with Table 3, Table 6 shows the blend information of PLA (NatureWorks 4032D), PHA (Tianan 1000P) and various additives on a ZSK-40 twin screw extruder, where Trigonox 101, Trigonox 117, and Trigonox 131 are AkzoNobel Corporate products. The Talc is provided by Specialty Minerals Inc The Heat Score is determined by to immerse a 0.5 by 6.0 inches specimen into 190° F. water for one minute. The score 10 means the sample keeping 100% of strength, while 0 means the sample losing 100% of strength. A brittle sample indicates that the test specimen broken when being fold 180 degree at room temperature, 'y/n' means some samples brook and some didn't.

Lids and Results

Selected PLA/PHA resin pellets was extruded into 17 mil thickness sheet stock on a single screw extruder (Davis Standard 3½" diameter, 32:1 L/D.); and then the sheet stock was thermoformed into hot drink lids. Table 7 is the test results of some of the lids.

TABLE 7

Performance of PLA/PHA Lids

| Sample # | Extrusion | Reliability | Drop Rate, g/20 sec. | Mass, g/10 lids |
|---|---|---|---|---|
| L-1 | ok | 0 | 1.2584 | 48.8760 |
| L-2 | ok | 0 | 1.1616 | 39.1413 |
| L-3 | ok | 0 | 1.3354 | 44.4127 |
| L-4 | ok | 0 | 1.2232 | 43.0657 |
| L-5 | ok | 0 | 1.4421 | 45.5770 |

The Reliability test is to turn a capped cup with hot water inside upside down for 2 minutes, and count the number of the lids dropped per 12 tests. The Leaking rate is the amount of water leaking from the side seam of a cup/lid system. While the cup with lid is turned into a level position, measure the weight of water collected in 20 seconds. The values are within our QC control limit.

FIG. 1 is a graph which shows a typical Differential Scanning calorimetry (DSC) Spectrum of PLA. The melt temperature is at 145.10° C., with a big heat absorption peak at 60.71° C.

Figure 2:
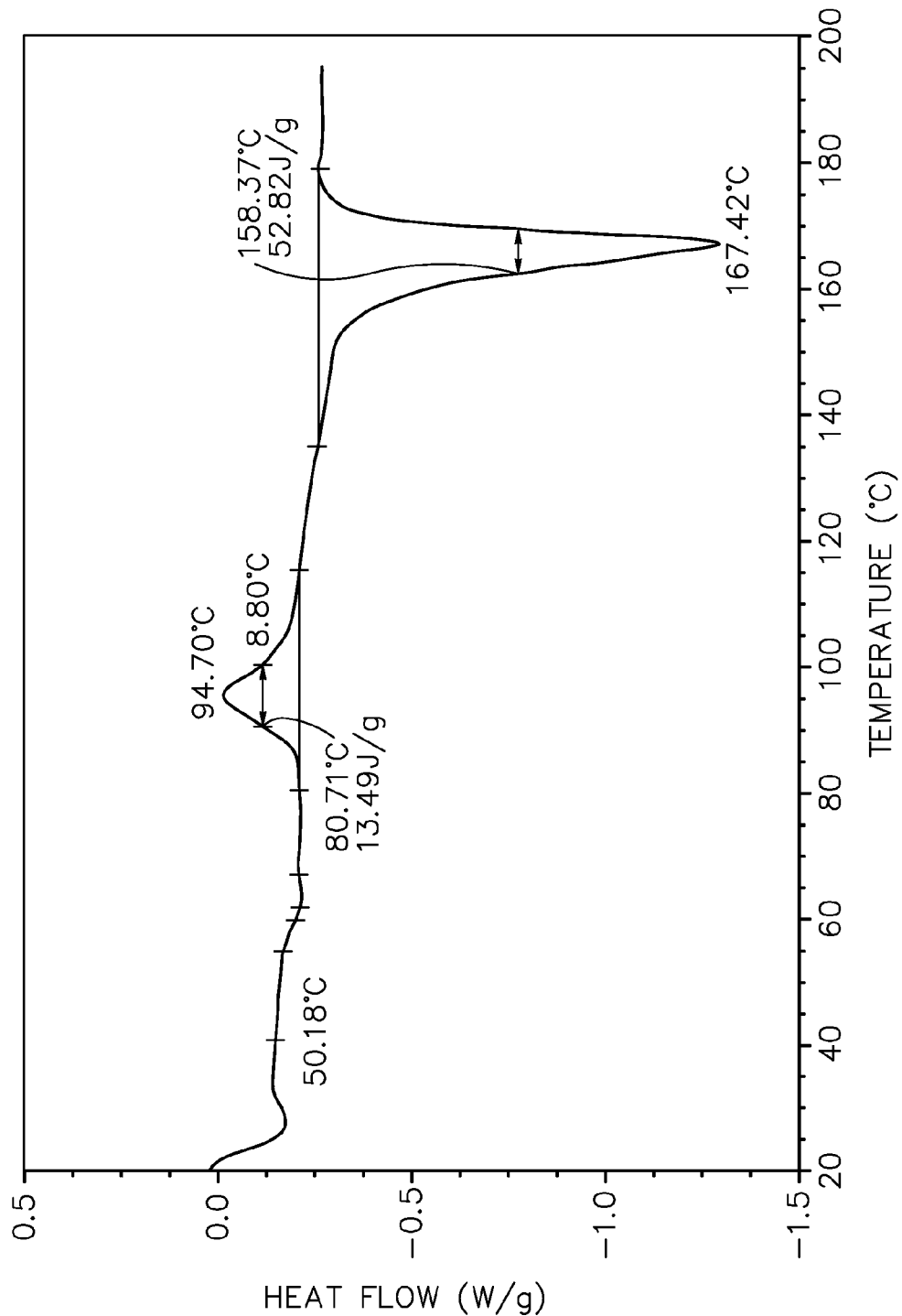
FIG. 2 is the differential scanning calorimeter (DSC) spectrum of resin of Lid L-5 that shows that the blend has a main melt temperature $T_m$ higher than that of the regular PLA resin.

FIG. 2 is the DSC spectrum of resin of Lid L-5. It shows that the blend has a main melt temperature $T_m$ at 167.42° C., which is higher than that of the regular PLA resin. The big heat absorption peak became much smaller, too.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A cup lid made of a thermoformable composite, the thermoformable composite comprising from about 5% to about 95% by weight of polylactic acid (PLA), from about 5% to about 95% by weight polyhydroxyalkanoate (PHA) polymer, and from about 0.01% to about 60% additives, the polylactic acid (PLA) has an average molecular weight in the range of from about 15,000 and about 300,000 and wherein the PLA and PHAs being crosslink together by intermolecular means to enhance performance and processability.

2. The cup lid of claim 1 wherein the polyhydroxyalkanoate (PHA) polymer comprises one or more of poly-beta-hydroxybutyrate, poly-alpha-hydroxybutyrate, poly-3-hydroxypropionate, poly-3-hydroxyvalerate, poly-4-hydroxybutyrate, poly-4-hydroxyvalerate, poly-5-hydroxyvalerate, poly-3-hydroxyhexanoate, poly-4-hydroxyhexanoate, poly-6-hydroxyhexanoate, polyhydroxybutyrate-valerate, polyglycolic acid, or polylactic acid.

3. The cup lid of claim 1 wherein the PLA is defined as all stereoisomeric forms of PLA including L- or D-lactides, and racemic mixtures comprising L- and D-lactides, D-polylactic acid, L-polylactic acid (PLLA), D,L-polylactic acid, meso-polylactic acid, and any combination of D-polylactic acid, L-polylactic acid, D,L-polylactic acid and meso-polylactic acid.

4. The cup lid of claim 1 wherein the intermolecular means is tie molecules.

5. The cup lid of claim 1 wherein the intermolecular means is chemical bounding.

6. The cup lid of claim 1 wherein the intermolecular means is combination of tie molecules and chemical bounding.

7. The cup lid of claim 1 the thermoformable composite has a $T_s$ value up to about 180° C.

8. The cup lid of claim 1 wherein the thermoformable composite has a $T_s$ value in the range of from about 80° C. to about 170° C.

9. The cup lid of claim 1 wherein the thermoformable composite has a heat distortion index of up to about 160° C.

10. The cup lid of claim 1 wherein the thermoformable composite has a heat distortion index of greater than about 60° C.

11. The cup lid of claim 1 wherein the thermoformable composite has a $T_m$ in the range of from about 90° to about 200° C.

12. The cup lid of claim 1 wherein thermoformable composite has a $T_s$ value greater than about 60° C. and a heat distortion index greater than about 50° C.

13. The cup lid of claim 1 wherein the thermoformable composite comprising from about 20% to about 80% by weight of polylactic acid (PLA), from about 20% to about 80% by weight polyhydroxyalkanoate (PHA) polymer, and from about 0.01% to about 40% additives wherein the PLA and PHAs being crosslink together by intermolecular means.

14. The cup lid of claim 1 wherein the thermoformable composite comprising from about 30% to about 60% by weight of polylactic acid (PLA), from about 30% to about 60% by weight polyhydroxyalkanoate (PHA) polymer, and from about 0.1% to about 35% additives wherein the PLA and PHAs being crosslink together by intermolecular means.

* * * * *